Figure 1:
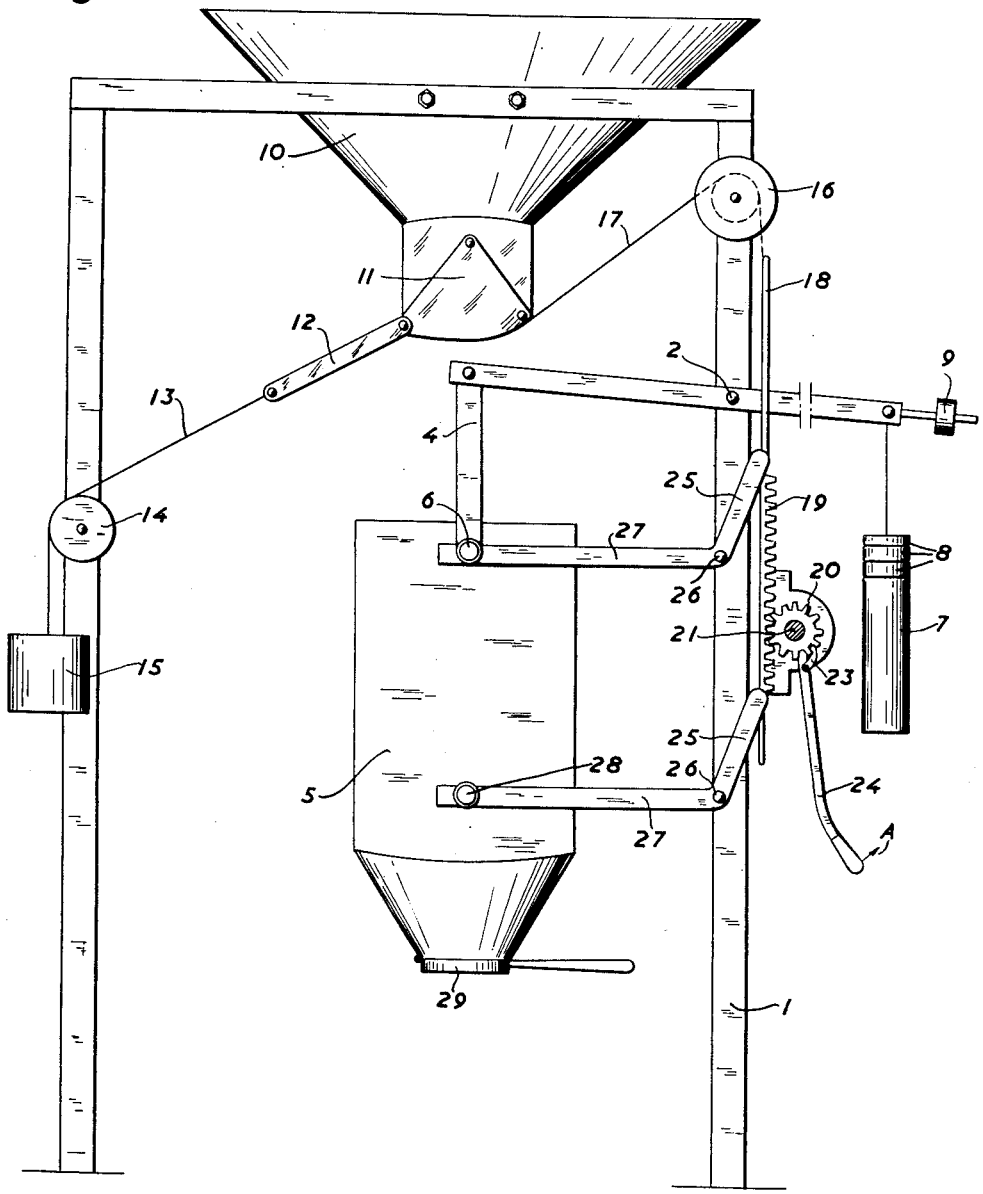

Dec. 2, 1952     H. S. CHRISTENSEN ET AL     2,620,154
AUTOMATIC MATERIAL-WEIGHING MACHINE
Filed May 23, 1946     2 SHEETS—SHEET 2
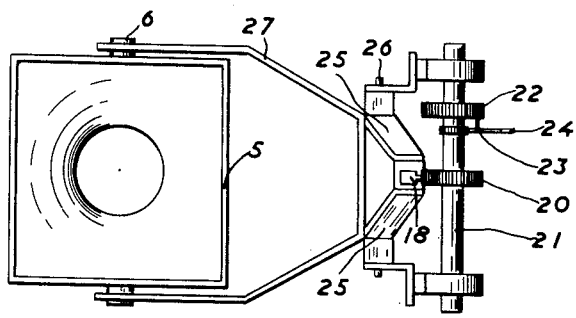
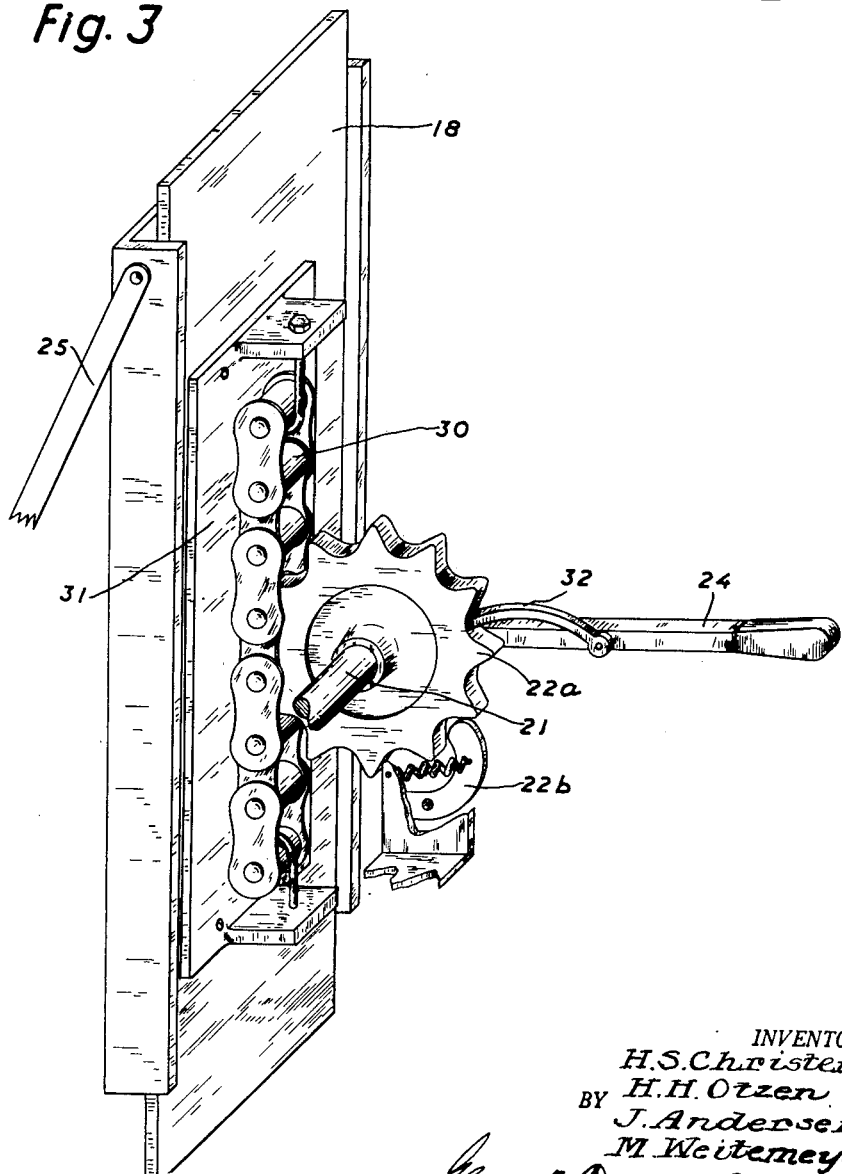

Patented Dec. 2, 1952

2,620,154

UNITED STATES PATENT OFFICE 2,620,154

AUTOMATIC MATERIAL-WEIGHING MACHINE

Holger Steen Christensen, Hans Otzen, Mogens Weitemeyer, and Johannes Andersen, Copenhagen, Denmark Application May 23, 1946, Serial No. 671,724
In Denmark March 27, 1942

Section 1, Public Law 690, August 8, 1946
Patent expires March 27, 1962

8 Claims. (Cl. 249—2)

This invention relates to automatic weighing machines for weighing material fed from a gated hopper into a weighing hopper. The invention may be advantageously applied in the weighing of any material coming from a storage hopper, such as coal, coke, peat, potatoes, etc.

An object of the present invention is to provide certain improvements in weighing machines of this character so that the person operating the weighing machine cannot by touching the operating member either intentionally or unintentionally fill more material into the weighing hopper than the quantity determined by the weights placed on the weigh-beam, because the connection between operating member and hopper shutter is broken when the position of equilibrium is passed.

Another object of the present invention is to provide a machine in which the function aimed at can be achieved by quite simple and cheap means as will be seen from the following description.

In an advantageous embodiment of the weighing machine in accordance with the invention the transmission mechanism comprises a part acting as a rack, which part meshes with a gear wheel but may be withdrawn from mesh, the said gear wheel being connected with the operating member. In an especially simple and preferred embodiment in accordance with the invention the part acting as a rack comprises a chain secured to a bedplate, with the links of which chain the teeth of the gear wheel can engage. This exceedingly simple construction has in practice proved very reliable and robust.

With the foregoing and other objects in view the invention will be more fully described with reference to the drawings, in which:

Figure 1 illustrates diagrammatically an automatic material weighing machine in accordance with the invention, in side elevation, Figure 2 shows part of the same weighing machine, viewed from above, and, Figure 3 is a perspective detail of a modification.

Referring now more particularly to the accompanying drawings, especially Figure 1, there is provided an upright 1, of which, as appears from Figure 2, there are two which carry a spindle 2 upon which a double armed weighbeam 3 is pivotally mounted. At one end of the weighbeam 3, which end is preferably forked, a weighing box 5 is suspended by means of two rods 4, which are rotatably secured to trunnions 6 mounted on the weighing box. The other end of the weighbeam 3 carries a weight 7 which may be so arranged that a certain fixed part of the weight serves for balancing the empty weighing box, while additional weights 8 determine the weight of material which the weighing machine is to weigh automatically.

When a given dry weight of material is to be measured, to compensate the comparatively small variations in the weight desired, occurring for example on account of variations in the degree of moisture of the material, a sliding weight 9 may be used as shown at the right-hand end of the weighbeam. This weight is set, e. g., in the morning before the automatic weighments are to commence, it being decided by tests how much the weight of the material has increased from its dry state to the moist state in which it is to be weighed, and then the weight is adjusted in conformity with the result obtained.

A hopper 10 carried by a frame of uprights and beams is provided with a feed gate or shutter 11 which is held in its closed position by means of a link 12, which is loaded by means of a weight 15 through the agency of a wire or cord 13 running over a pulley 14. The gate 11 is connected by means of a cord or other flexible element 17, passing over a pulley 16, to a part 18 of the transmission mechanism, which part is, at least at its lower end, shaped as a rack 19. In Figure 1 the rack 19 is shown in mesh with a gear wheel 20 which, as will be seen from Figure 2, is mounted on a spindle 21 which also carries a ratchet wheel 22; the latter is arranged for actuation by a handle 24 furnished with a pawl 23. Both the ratchet wheel 22 and the gear wheel 20 are fixed on the spindle 21.

The part 18 is capable of vertical movement and, by means of two arms 25 of a pair of bell crank levers 25, 27 is prevented from moving to the left in the figure, the rack 19 consequently being held in mesh with the gear wheel 20. The bell crank levers are pivoted upon spindles 26 secured to the uprights 1, and their arms 27 are pivotally attached to trunnions 6 and 28 on the weighing box 5.

In Figure 1 the weighing box 5 is shown, for the sake of simplicity, with an ordinary gate or valve 29 below, but in practice it will usually be preferred to provide the weighing box with a delivery gate arrangement which permits emptying either at one or the other side of the weighing box.

The apparatus functions in the following manner. When the handle 24 is moved in the direction of the arrow A in Figure 1, the ratchet wheel 22 due to the effort applied through the pawl 23 will turn the spindle 21 in an anti-clockwise direction, whereby the rack 19 will be moved downwards. Another pawl 22b (Fig. 3) for the ratchet wheel 22 serves to prevent reverse movement when the handle 24 is released and returns to its initial position by gravity. The part 18 thus moves downwards and thereby opens the gate 11 of the hopper 10 against the loading due to the weight 15. Thereby the material issues from the hopper and falls into the weighing box 5, and when an amount of material corresponding to the weight of the weights 8 and 9 has run into the weighing box, the latter moves downwards. Due to this downward movement the bell crank levers turn upon their spindles 26, and the arms 25 move to the left in Figure 1 and withdraw the rack 19 from mesh with the gear wheel 20. This causes the part 18 to move upwards under the loading due to the weight 15, whereby the gate 11 prevents further supply of material from the hopper 10 to the weighing box.

When the weighing box is emptied by opening the gate or valve 29, it returns upwardly under the loading due to the weights 8 and 9, whereby the bell crank levers 25, 27 re-mesh the rack 19 with the gear wheel 20, so that the next filling of the weighing box can be performed by operating the handle 24.

Details in the construction described may be modified without the construction departing from the scope of the invention. It is possible, for example, instead of the ratchet wheel 22 and the gear wheel 20 to use a single ratchet wheel 22a (Fig. 3), the teeth of which are shaped in such manner that they can cooperate with the pawls 22a and 32 as well as with the rack. The latter, as mentioned before, is an especially simple embodiment consisting of a chain 30 secured to a bedplate 31, with the links of which chain the teeth of the gear wheel 20 can engage.

What we claim is:

1. An automatic weighing machine comprising a fixed storage hopper provided with a discharge opening and a shutter normally held in a position closing the discharge opening, a weighing hopper placed under the discharge opening, a beam suspending said weighing hopper at one end, a weight at the other end of said beam, a transmission mechanism, a handle connected through said transmission mechanism with the shutter, said transmission mechanism including at least two mutually separatable cooperating parts one connected to the handle and one to the shutter, means connected to the system consisting of beam and weighing hopper and operative upon movement of the beam and weighing hopper to disengage the parts of the transmission mechanism by displacing one of said parts out of the operation zone of the other part and permitting said other part to move and release the shutter for the closing operation.

2. An automatic weighing machine as claimed in claim 1, wherein said displacing means comprises a pivotally mounted double-armed lever the two arms of which form an angle smaller than 180°, one end of one arm being connected to the weighing hopper and the opposite end of the other arm being connected to the movable part of the transmission mechanism.

3. An automatic weighing machine as claimed in claim 1, wherein the first mentioned part of the transmission mechanism is constituted by a rack and the other part by a gear wheel connected to the handle.

4. An automatic weighing machine as claimed in claim 1, wherein the first mentioned part of the transmission mechanism is constituted by a rack in the form of a link chain secured to a bedplate and the other part includes a gear wheel mounted to engage the links of the chain.

5. An automatic weighing machine comprising a fixed storage hopper provided with a discharge opening and a shutter normally held in a position closing the discharge opening, a weighing hopper placed under the discharge opening, a beam suspending said weighing hopper at one end, a weight connected to the other end of the beam, a transmission mechanism, a handle connected through the transmission mechanism with the shutter, the transmission mechanism including a rack connected with the shutter for opening movement by moving longitudinally and further connected with and displaceable transversely by the weighing hopper and beam thereby being permitted to move longitudinally and release the shutter for the closing operation, a spindle, a gear wheel mounted on the spindle, a ratchet wheel fixed to said spindle, and a pawl mounted on the handle coating with said ratchet wheel.

6. An automatic weighing machine comprising a fixed storage hopper provided with a discharge opening and a shutter normally held in a position closing the discharge opening, a weighing hopper placed under the discharge opening, a beam suspending said weighing hopper at one end, a weight connected to the other end of the beam, a transmission mechanism, a handle connected through the transmission mechanism with the shutter, the transmission mechanism including a longitudinally and transversely operable rack and a gear wheel, a cord system connecting the rack with the shutter for longitudinal closing and opening operation, a pivoted bell crank lever having its arms disposed at an angle, one arm of the lever being connected to the beam and the weighing hopper and the other lever arm being connected to the rack for transverse operation disengaging the rack from the gear wheel so that the rack is permitted to move and releases the shutter for the closing operation.

7. An automatic weighing machine as claimed in claim 6, wherein both of the arms of the bell crank lever are forked, one fork embracing the weighing hopper and the other fork embracing the rack.

8. An automatic weighing machine as claimed in claim 6, provided with two of said bell crank levers forming links between the weighing hopper and the rack.

HOLGER STEEN CHRISTENSEN.
HANS OTZEN.
MOGENS WEITEMEYER.
JOHANNES ANDERSEN.

REFERENCES CITED

The following references are of record in the file of this patent:

UNITED STATES PATENTS

| Number | Name | Date |
|---|---|---|
| 753,606 | McAllister | Mar. 1, 1904 |
| 932,688 | Droz | Aug. 31, 1909 |
| 984,537 | Buschman | Feb. 21, 1911 |
| 1,133,167 | Mioton | Mar. 23, 1915 |
| 1,851,017 | Middleboe | Mar. 29, 1932 |
| 2,052,996 | Witte | Sept. 1, 1936 |
| 2,101,232 | Witte | Dec. 7, 1937 |

FOREIGN PATENTS

| Number | Country | Date |
|---|---|---|
| 616,708 | Great Britain | 1949 |